(12) United States Patent
Lim et al.

(10) Patent No.: US 9,392,099 B2
(45) Date of Patent: Jul. 12, 2016

(54) MOBILE SURVEILLANCE SYSTEM

(71) Applicant: Cellco Partnership Verizon Wireless, Basking Ridge, NJ (US)

(72) Inventors: Kevin Lim, Danville, CA (US); Rahim Charania, Euless, TX (US); Ramesh Marimuthu, Edison, NJ (US); Alex Hoyos, Miami, FL (US)

(73) Assignee: Cellco Partnership, Basking Ridge, NJ (US)

( * ) Notice: Subject to any disclaimer, the term of this patent is extended or adjusted under 35 U.S.C. 154(b) by 277 days.

(21) Appl. No.: 13/924,846

(22) Filed: Jun. 24, 2013

(65) Prior Publication Data

US 2014/0375800 A1    Dec. 25, 2014

(51) Int. Cl.
*G08B 13/196* (2006.01)
*H04M 1/725* (2006.01)
*G08B 21/02* (2006.01)
*G08B 25/01* (2006.01)
*G08B 27/00* (2006.01)

(52) U.S. Cl.
CPC ..... *H04M 1/72538* (2013.01); *G08B 13/19621* (2013.01); *G08B 21/028* (2013.01); *G08B 21/0269* (2013.01); *G08B 25/016* (2013.01); *G08B 27/005* (2013.01)

(58) Field of Classification Search
CPC ................... H04M 1/72544; G08B 13/19621; G08B 21/0269; G08B 25/016; G08B 26/007; G08B 21/028; G08B 13/193; G08B 13/19643; G08B 19/608; G08B 13/19656; G08B 13/19663; H04N 5/332; H04N 5/23216; H04N 5/23206; H04N 5/247; H04N 7/17318; H04N 7/181; H04N 21/4223; H04N 21/47202; H04N 21/6587
USPC .......................................................... 348/143
See application file for complete search history.

(56) References Cited

U.S. PATENT DOCUMENTS

| | | | |
|---|---|---|---|
| 2006/0078047 A1* | 4/2006 | Shu et al. ................. | 375/240.01 |
| 2009/0313659 A1* | 12/2009 | Samuels ......................... | 725/78 |
| 2011/0043631 A1* | 2/2011 | Marman et al. ................ | 348/143 |
| 2013/0057696 A1* | 3/2013 | Felt et al. ...................... | 348/158 |
| 2013/0215266 A1* | 8/2013 | Trundle et al. ................ | 348/143 |
| 2014/0085480 A1* | 3/2014 | Saptharishi ................... | 348/159 |
| 2014/0132772 A1* | 5/2014 | Billau et al. .................. | 348/159 |
| 2014/0368643 A1* | 12/2014 | Siegel et al. .................. | 348/143 |

* cited by examiner

*Primary Examiner* — Jay Au Patel
*Assistant Examiner* — Francis G Geroleo

(57) ABSTRACT

A computer-implemented method may include receiving, via a mobile access network, surveillance data from one or more mobile surveillance devices, wherein the one or more mobile surveillance devices are associated with a monitored location, system, or group. An event condition associated with the monitored location, system, or group is identified based on the received surveillance data, wherein the event condition corresponds to at least one of the one or more mobile surveillance devices. An alert notification is generated and transmitted to one or more user devices based on the event identified condition. A request to view at least a portion of the surveillance data is received from a user device in response to the alert notification. At least the portion of the surveillance data is transmitted to the user device in response to the request.

20 Claims, 11 Drawing Sheets

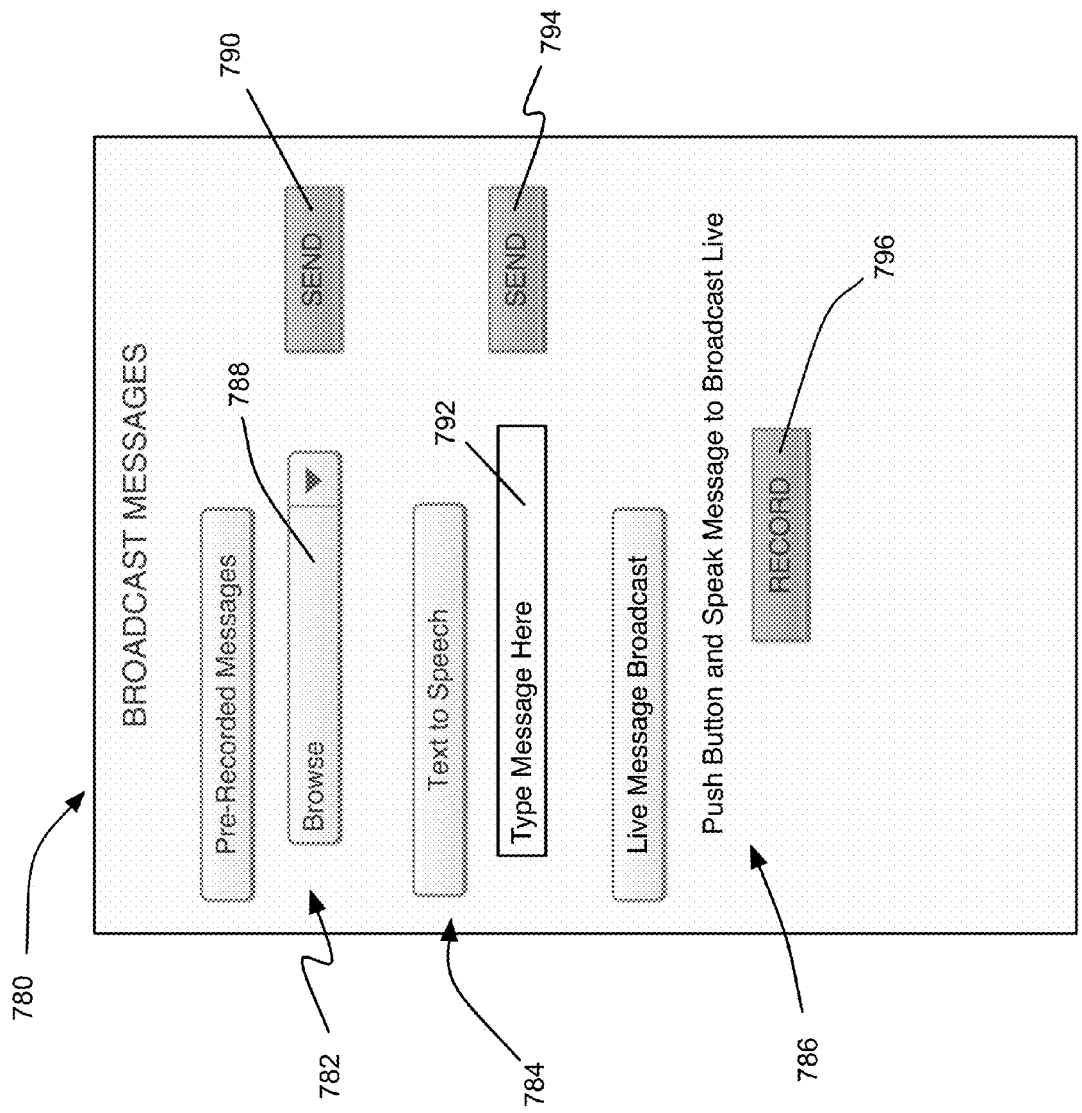

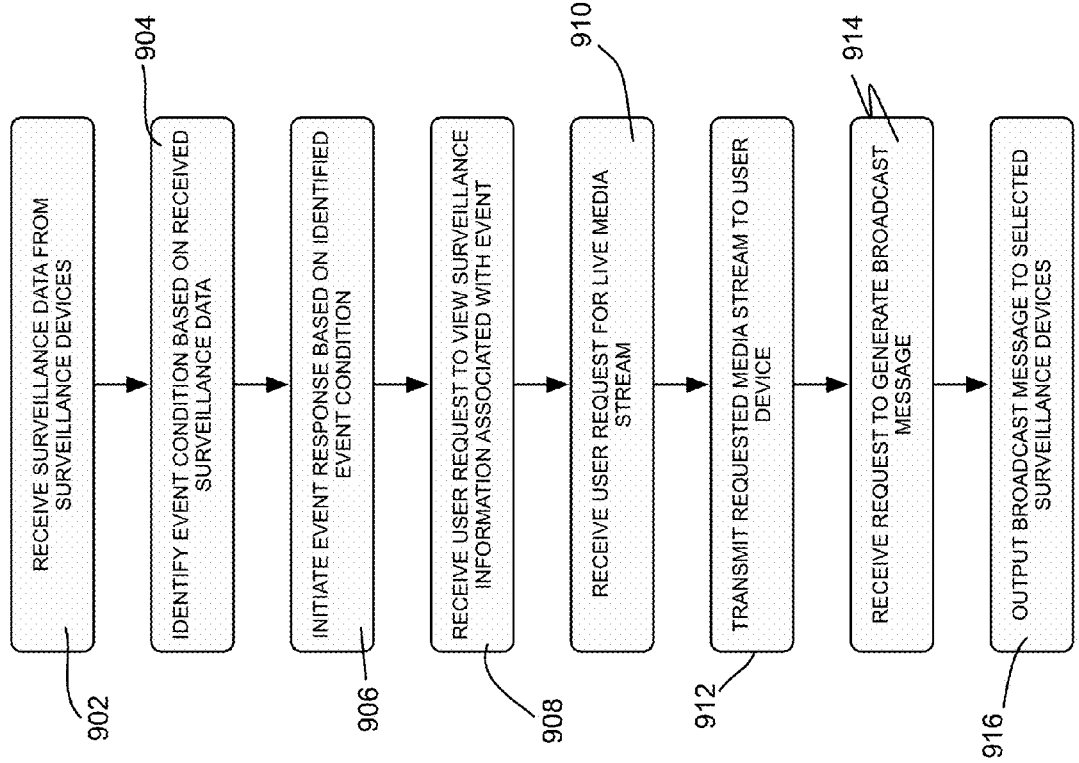

MOBILE SURVEILLANCE SYSTEM

BACKGROUND

Effective monitoring and surveillance are crucial to responding to events as quickly and as appropriately as possible. Conventional monitoring systems typically rely on fixed location surveillance devices, such as video or still cameras. Such traditional cameras may store data locally for periodic review or collection or may feed data to a centralized system that supports real-time monitoring. Unfortunately, such fixed surveillance systems are inflexible and fail to adequately provide support for monitoring of dynamic systems.

BRIEF DESCRIPTION OF THE DRAWINGS

FIGS. 7A-7C are exemplary user interfaces associated with the surveillance monitoring interface logic of FIG. 5;

FIG. 9 is a flow diagram illustrating exemplary processing for implementing a surveillance monitoring and event response system consistent with embodiments described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Figure 1:
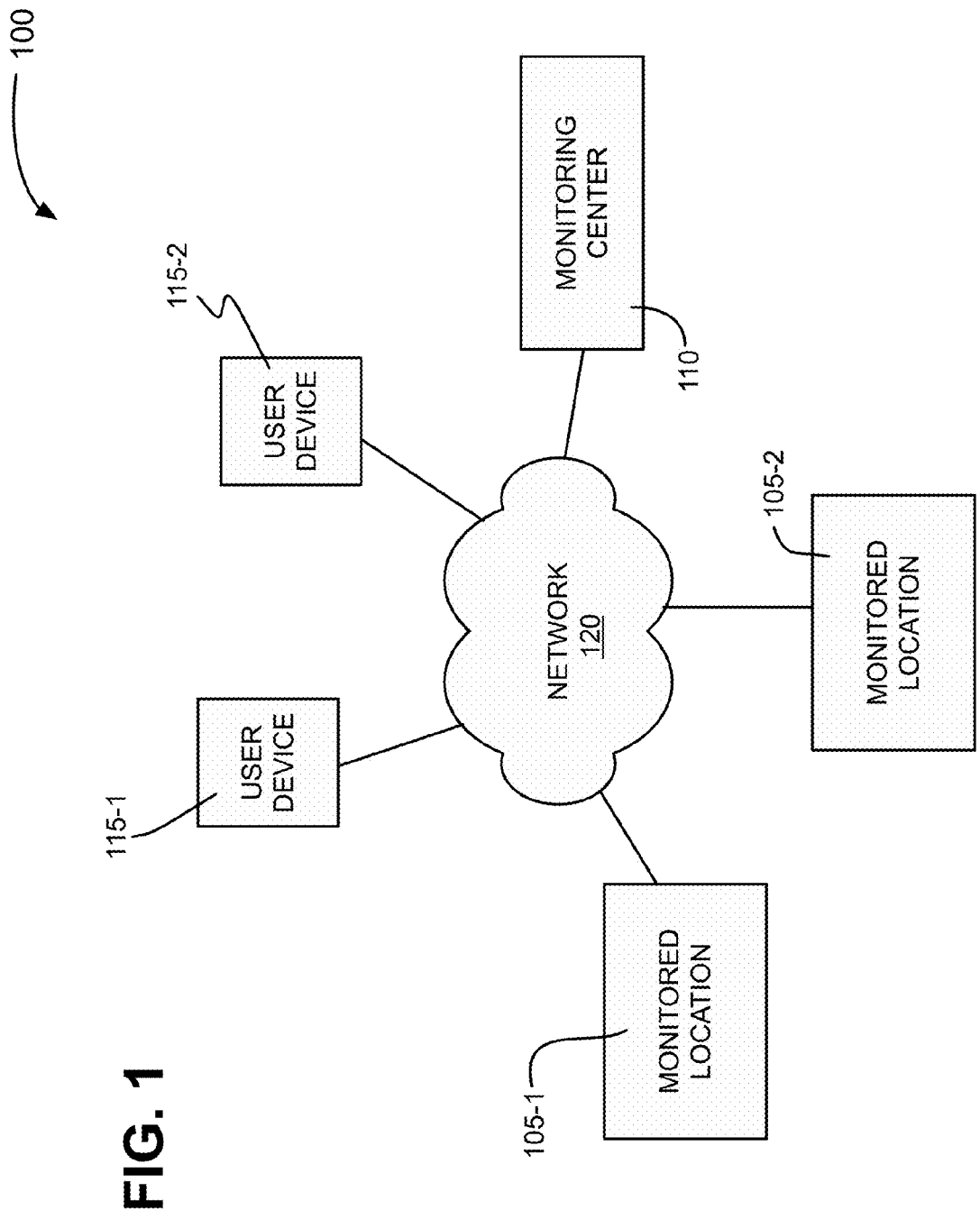
FIG. 1 illustrates a block diagram of an exemplary environment in which systems and methods described herein may be implemented.

FIG. 1 is a block diagram of an exemplary environment 100 in which systems and methods described herein may be implemented. As shown, environment 100 may include monitored locations 105-1 and 105-2 (collectively referred to as "monitored locations 105" and individually referred to as "monitored location 105"), a monitoring center 110, and user devices 115-1 and 115-2 (collectively referred to as "user devices 115" and individually referred to as "user device 115") connected via a network 120.

Consistent with embodiments described herein, monitored locations 105 may include any location, collection of locations, system, individuals, etc., for which monitoring or surveillance is desired. Examples include vehicles, transportation systems (e.g., trains and rail stations, subway systems, etc.), homes, offices, office buildings, school campuses, government buildings, airports, sports stadiums, temporary locations, etc. Monitored locations 105 may include permanent or temporary locations. As described in additional detail below with respect to FIG. 2, each monitored location 105 may include one or more surveillance or devices configured to collect and provide surveillance information regarding the monitored location.

Monitoring center 110 may include any device or combination of devices configured to receive surveillance or alert information from monitored locations 105 (e.g., multimedia data, metadata, alert data, etc.), store the received information, and provide the received information to system users via a number of mechanisms, such as dedicated applications, web-based portals, email/phone/text message notifications, etc.

In some embodiments, notifications or alerts from monitoring center 110 may include event handling instructions associated with a particular event or occurrences. In other embodiments, event handling instructions or commands are identified at each monitoring device in a monitored location 105.

User devices 115 may include any type of communications device capable of receiving information relating to one or more monitored locations 105. User devices 115 may enable users to send/receive messages, view content, and/or interact with other devices. For example, user devices 115 may include a personal computer (e.g., a laptop or desktop PC), a tablet computer, a smart phone, a set-top box (connected to a television), or other types of computational or communication devices that can communicate with devices in network 100. In one implementation, each user device 115 may include a web browser or other software to enable user device 115 to access web sites or other information from monitoring center 110 (e.g., a web or application server hosted by monitoring center 110).

Network 120 may include a local area network (LAN), a wide area network (WAN), a metropolitan area network (MAN), a telephone network, such as the Public Switched Telephone Network (PSTN) or a mobile (i.e., cellular) telephone network, an intranet, a portion of the Internet, an optical fiber-based network, or a combination of networks.

In some implementations, network 120 may include a high speed mobile access network controlled or operated by, for example, a telecommunications company that provides telephone and/or data access to monitored locations 105 and user devices 115. Generally, network 120 may include at least one radio access network capable of supporting wireless communications to/from devices in monitored locations 105. The radio access network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or a network implemented in accordance with future wireless access network standards.

Network 120 may include network devices that are not shown, such as voice gateways, routers, switches, firewalls, and/or servers. Network 120 may include a hardwired network using wires and/or optical fibers and/or a wireless network using free-space optical and/or radio frequency (RF) transmission paths. Implementations of networks and/or devices described herein are not limited to any particular data format, type, and/or protocol.

Figure 2:
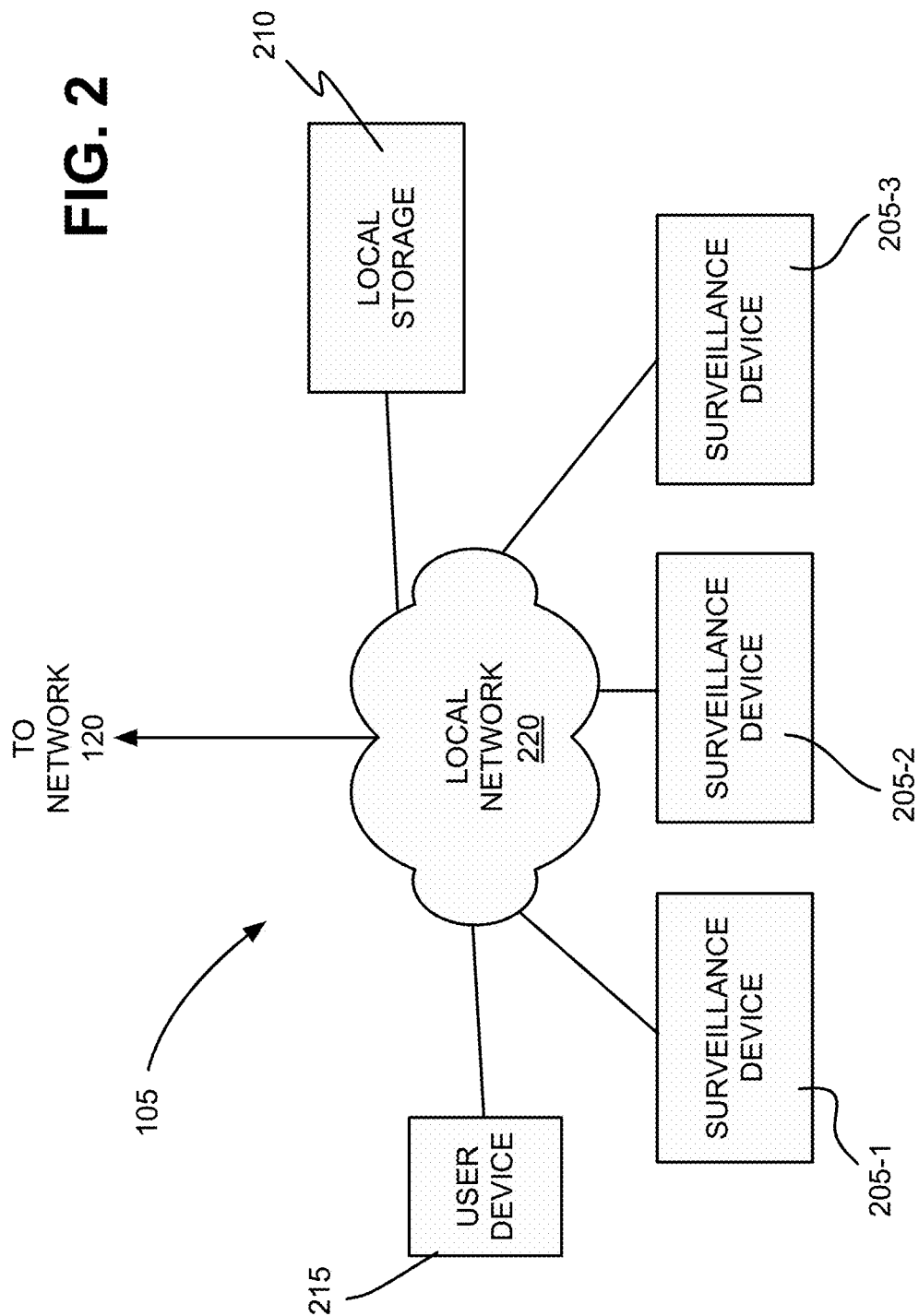
FIG. 2 illustrates a block diagram of an exemplary monitored location of FIG. 1.

FIG. 2 is a block diagram of an exemplary monitored location 105 according to embodiments described herein. As shown, monitored location 105 may include surveillance devices 205-1 to 205-3 (collectively referred to as "surveillance devices 205" and individually referred to as "surveillance device 205"), local storage 210, and user device 215 connected via a local network 220. Although three surveillance devices 205 and one user device 215 are shown in FIG. 2, it practice as few as one surveillance device and as many as dozens or even hundreds of surveillance devices as well as multiple user devices may be included in a single monitored location 105. For example, a monitored location 105 consisting of a single delivery vehicle may include a single surveillance device 205 and a single user device 215, while a monitored location 105 consisting of an entire freight train may include dozens of surveillance devices 205 and several user devices 215. In addition, although FIG. 2 illustrates surveillance devices 205 and user devices 215 connecting to local network 220, in some implementations, each surveillance device 205/user device 215 may connect directly to network 120, such as via a cellular telephone network.

Consistent with embodiments described herein, surveillance devices 205 may include any device that is connected to local network 220 or network 120 and that includes at least one of location monitoring capabilities (e.g., global positioning satellite (GPS) capabilities), video capture capabilities, audio capture capabilities, or sensor capabilities. For example, suitable surveillance devices 205 may include security cameras, dedicated GPS devices, mobile telephones (e.g., cellular telephones or smart phones), motion sensors, security sensors, etc.

User device 215 may include any device for receiving information from a user associated with monitored location 105. In some embodiments, a user of user device 215 may be referred to as a field agent and user device 215 may be configured to interact with monitoring center 110 and/or surveillance devices 205 to provide dynamic updates regarding monitored location 105 and to receive and respond to alerts or notifications identified by monitoring center 110 or users of user devices 115 (also referred to as monitors).

Local storage 210 may include any device for receiving and storing surveillance information from surveillance devices 205 prior to or concurrently with the transfer of such information to monitoring center 110 via network 120 (or network 220 and network 120). For example, local storage 210 may include a network attached storage device, a database, a server computer, etc. Although local storage 210 is shown as a separate device from surveillance devices 205, in some embodiments each surveillance device 205 may include its own local storage 210 that is capable of storing surveillance information for a predetermined period of time or during periods of missing, slow, or intermittent network connectivity to monitoring center. As described below, surveillance devices 205 may be configured to transmit surveillance information from local storage 210 to monitoring center 110 when network connectivity stabilizes.

The environment described in FIGS. 1 and 2 is simplified for the purposes of brevity and may include any number of monitored locations 105, surveillance devices 205, user devices 115/215, networks 120/220, or monitoring centers 110. In addition, environment 100 may include other devices not depicted in FIGS. 1 and 2. Implementations may further include one or more monitoring centers 110 residing in a single network or domain, or spread across multiple networks and/or domains, e.g., on a regional basis or a customer-type basis, etc. Additional details regarding the operation of monitoring center 110, surveillance devices 205, user devices 115, and user device 215 are set forth below.

Figure 3:
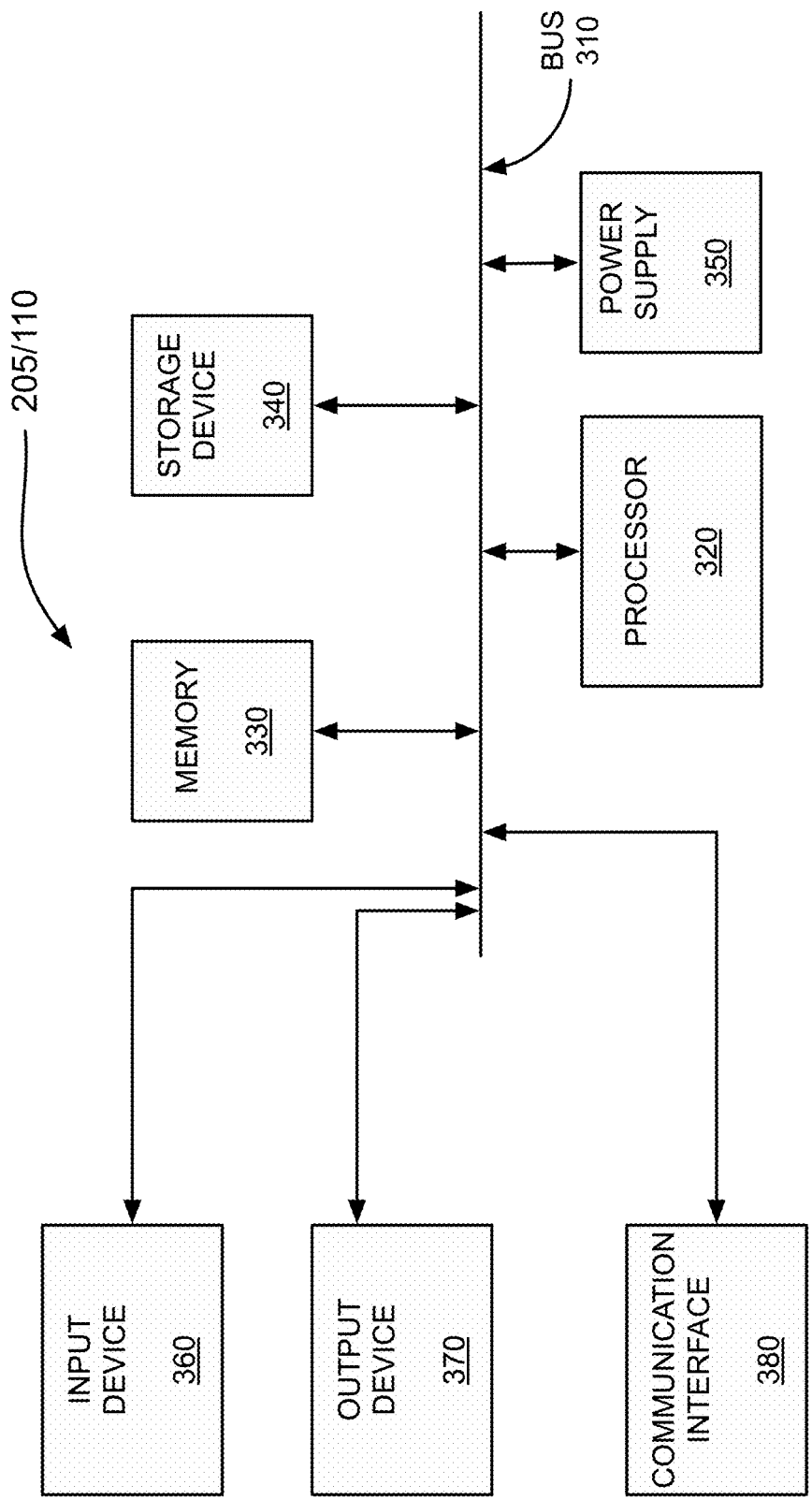
FIG. 3 is a diagram illustrating exemplary components of a device of FIGS. 1 and 2.

FIG. 3 is a diagram illustrating components of exemplary surveillance device 205. In some implementations, surveillance devices 205, user devices 115, user device 215, and monitoring center 110 devices may include similar components. Referring to FIG. 3, surveillance devices 205 (e.g., networked security camera, a cell phone, etc.) may include bus 310, processor 320, memory 330, storage device 340, power supply 350, input device 360, output device 370, and communication interface 380. Surveillance devices 205 may be configured in a number of additional ways and may include other or different components. For example, surveillance devices 205 may include additional components, such as one or more modulators, demodulators, encoders, decoders, etc., for processing data.

Bus 310 may include a path that permits communication among the elements of surveillance device 205. Processor 320 may include one or more processors, microprocessors, application specific integrated circuits (ASICs), field programmable gate arrays (FPGAs), or other processing logic that may interpret and execute instructions. Memory 330 may include a random access memory (RAM) or another type of dynamic or static (e.g., read only memory (ROM)) storage device that may store information and instructions for execution by processor 320. Storage device 340 may include a magnetic and/or optical recording medium. Power supply 350 may include a battery or other source for powering surveillance device 205.

Input device 360 may permit information to be input to surveillance device 205, such as a camera, a sensor (e.g., GPS sensor, etc), microphone, a keypad, a keyboard, a touch screen, a mouse, a pen, etc. Output device 370 may output information to the user, such as a display, a printer, one or more speakers, etc. Consistent with implementations described herein, all surveillance devices 205 need not include output devices 370 for providing information to users, but rather may output all information via communication interface 380.

Communication interface 380 may include a transceiver that enables surveillance device 205 to communicate with other devices and/or systems, such as other surveillance devices 205, local storage 210, and/or monitoring center 110. For example, communication interface 380 may include a wireless network interface for coupling to monitoring center 110 via a mobile access or wireless LAN networks 120/220. In other implementations, communication interface 380 may include a modem or Ethernet interface, for communicating via networks 120 and 220.

In implementations consistent with embodiments described herein, surveillance devices 205 may perform processing associated with capturing surveillance information and forwarding the captured information to monitoring center 110. Furthermore, the described system may be configured to identify and enforcing device or premises event rules when an identified event condition occurs, such as an out of norm condition, location-based condition, motion detection, etc. Surveillance devices 205 may perform these operations in response to processor(s) 320 executing sequences of instructions contained in a computer-readable medium, such as memory 330. A computer-readable medium may include a physical or logical memory device. The software instructions may be read into memory 330 from another computer-readable medium, such as data storage device 340, or from another device via communication interface 380. The software instructions contained in memory 330 may cause processor 320 to perform processes that are described below. Alternatively, hard-wired circuitry may be used in place of or in combination with software instructions to implement processes consistent with the embodiments described herein. Thus, implementations described herein are not limited to any specific combination of hardware circuitry and software. For the purposes of this application, a "computer" may be defined as a device, or combination of devices, that performs mathematical or logical operations, or that assembles, stores, correlates, or otherwise processes information.

Figure 4:
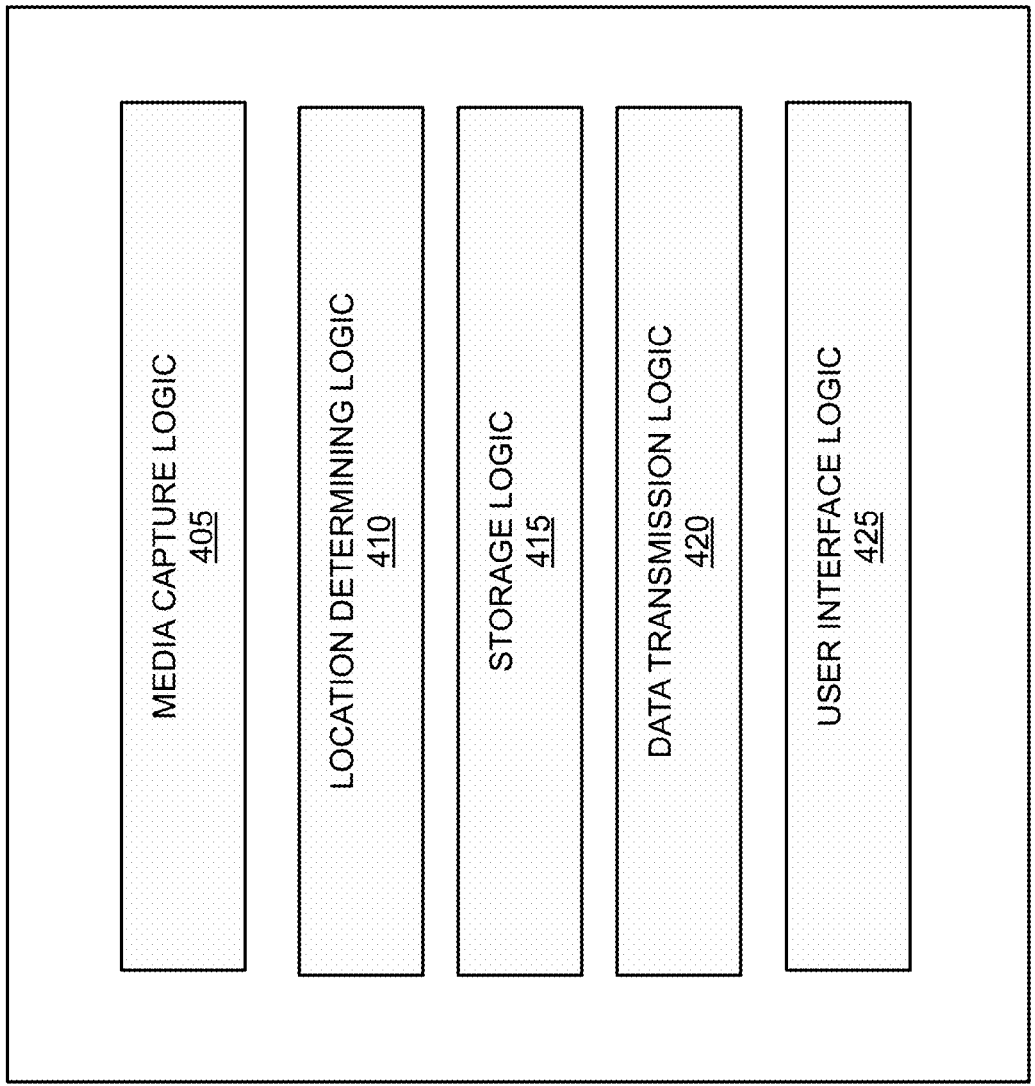
FIG. 4 is a functional block diagram of exemplary components implemented in the surveillance devices of FIG. 2.

FIG. 4 is a functional block diagram of exemplary components surveillance devices 205. As shown, each surveillance device 205 may include media capture logic 405, location determining logic 410, storage logic 415, and data transmission logic 420. Furthermore, in some embodiments, surveillance devices 205 may include user interface logic 425.

Media capture logic 405 may be configured to receive or capture media data corresponding to monitored location 105. For example, media capture logic 405 may be configured to capture audio, video, or still image data, or any combination thereof. Media capture logic 405 may include, based on the type of information being collected, a video camera, a still image camera, and/or a microphone. Furthermore, in some implementations, media capture logic 405 may facilitate high resolution (e.g., HDTV) or high quality media captures. Consistent with embodiments described herein, media capture logic 405 may be configured to capture data continuously or periodically, may capture media be based on received event, notification, or alert information, or upon request by a user of user device 115 or user device 215.

In the event that surveillance device 205 includes one or more non-media related sensors, such as motion sensors, position/tilt sensors, accelerometers, gyroscopes, moisture sensors, airbag deployment sensors, light sensors, etc., media capture logic 405 may be configured to capture information from such sensors in a manner similar to the media information described above.

In some embodiments media capture logic 405 may be responsive to user commands, e.g., from a user of surveillance device 205, a user of user device 115, a field agent, or an administrator at monitoring center 110. For example, media capture logic 405 may be configured to receive and respond to camera motion (e.g., pan) or zoom controls, etc.

Location determining logic 410 may be configured to calculate or determine a geographic location of surveillance device 205. For example, as briefly described above, location determining logic 410 may include GPS logic for receiving GPS signals from a number of orbiting satellites and determining a geographic position (e.g., longitude and latitude, street address, etc.) based on the received GPS signals. In addition to geographic location information, in some embodiments, location determining logic 410 may also be configured to determine a speed with which surveillance device 205 is moving based on the determined location information over time.

Storage logic 415 may be configured to store, either persistently or temporarily, the data generated by media capture logic 405 and location determining logic 410. For example, when surveillance device 205 comprises a surveillance camera, storage logic 415 may be configured to store captured video data and associated location/speed data corresponding to the location of surveillance device 205 when the video data was captured. In some embodiments, storage logic 415 is configured to store the information in local storage 210. As discussed above, storage of media and location information at monitored locations 105 may facilitate transmission of data to or retrieval of data by monitoring center 110 during times of disrupted communications between surveillance device(s) 205 and monitoring center 110.

Data transmission logic 420 may be configured to transmit the collected media data and determined location data to monitoring center 110 via network 220 and/or network 120.

In some embodiments, data transmission logic 420 may be configured to transmit the collected/determined data in substantially real-time, while in other embodiments, the data may be transmitted to monitoring center 110 periodically, or at times of high network stability/performance.

User interface logic 425 may be configured to receive commands or instructions from a user of surveillance device 205. For example, as described in additional detail below, user interface logic 425 may be configured to receive notification or alert information from monitoring center 110. User interface logic 425 may be configured to output the received notification or alert information either audibly, visually, or both to notify a user of surveillance device 205 about identified conditions.

In addition, user interface logic 425 may be configured to receive alert or update information from a user of surveillance device 205 or user device 215 and transmit the alert or update information to monitoring center 110. Such information, also referred to as broadcast messages, may be output or displayed to facilitate a desired action on the part of a user (e.g., of surveillance device 205 or user device 215).

Consistent with embodiments described herein, user device 215 may be configured similarly to surveillance device 205, however, user device 215 may be further configured to more commonly interact with a particular user. For example, although a particular surveillance device 205 may include a dash-mounted camera in a delivery vehicle, a corresponding field agent user device 215 may include a cell phone or computing device associated with the driver of the delivery vehicle. Consequently, although user device 215 may be capable of providing similar functionality as surveillance device 205, in some embodiments, the primary function of the surveillance device 205 is to provide surveillance information, while the primary function of user device 215 may be as a user communication device.

The logical blocks illustrated in FIG. 4 may be implemented in software, hardware, a combination of hardware and software. In alternative implementations, some or all of the components illustrated in FIG. 4 may be implemented in other devices or combinations of devices, such as in combination with local storage 210, etc.

Figure 5:
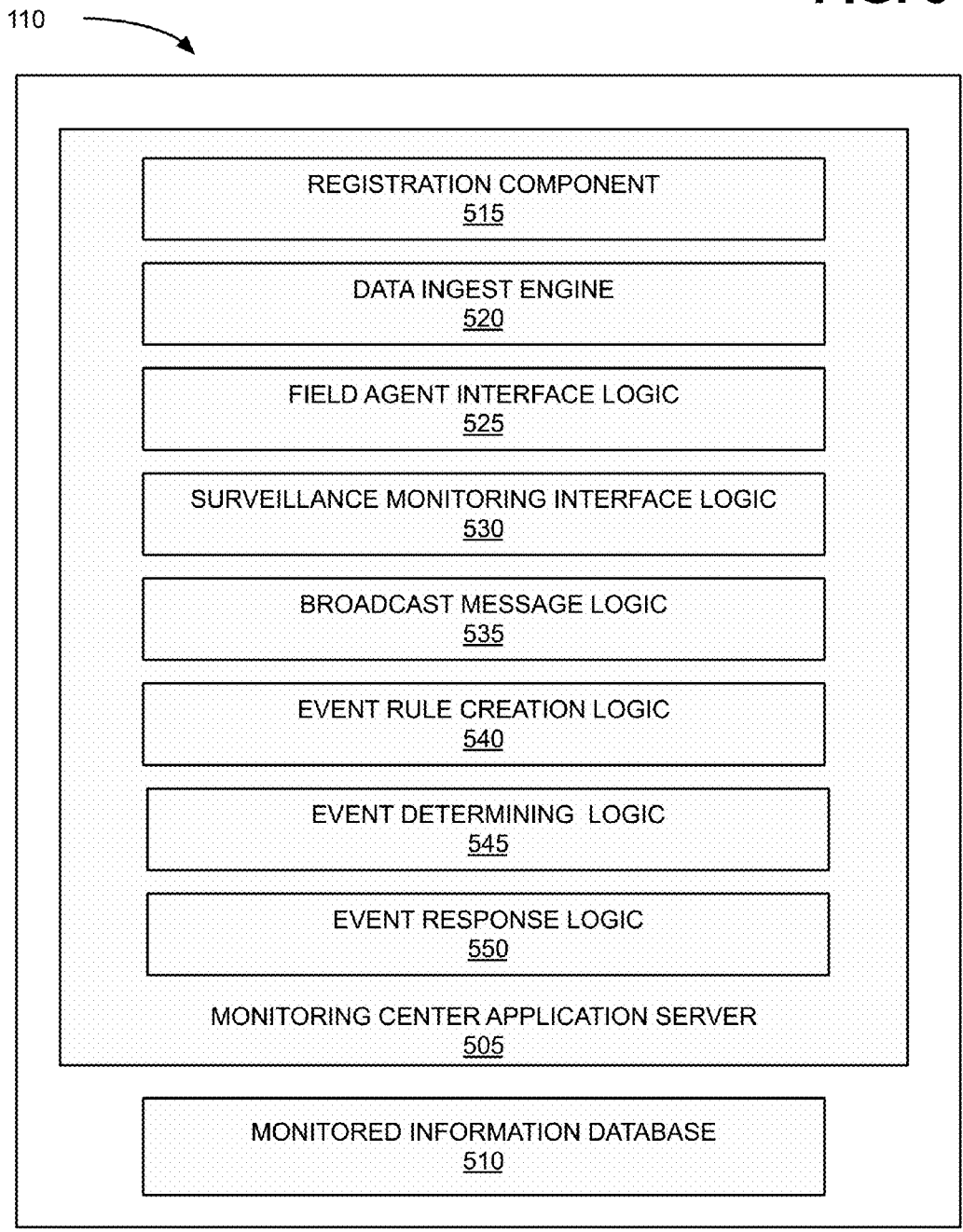
FIG. 5 is a functional block diagram of exemplary components implemented in the monitoring center of FIG. 1.

FIG. 5 is a functional block diagram of exemplary components implemented in monitoring center 110. As shown, monitoring center 110 may include a monitoring center application server 505 and a monitored information database 510. As shown, monitoring center application server 505 may include a registration component 515, a data ingest engine 520, field agent interface logic 525, surveillance monitoring interface logic 530, broadcast message logic 535, event rule creation logic 540, event determining logic 545, and event response logic 550.

Monitoring center application server 505 may include one or more server devices, or other types of computation or communication devices that gather, process, search, and/or provide information in a manner described herein. In one exemplary implementation, monitoring center application server 505 is configured to receive data from surveillance devices 205 and/or user devices 215 via network 120 and store some or all of the information in monitored information database 510 and/or forward the information to user devices 115 via network 120. In some implementations, monitoring center application server 505 may be a distributed component.

In one example, monitoring center application server 505 may provide, to a user device 115, a web page to manage registration and configuration of surveillance devices 205, user devices 215, and other user devices 115 or accounts corresponding to user devices 115. For example, monitoring center application server 505 may provide an entry point for secure web portal for customers. Monitoring center application server 505 is further configured to receive surveillance information relating to monitored locations 105, e.g., from surveillance devices 205, local storage 210, and/or user device 215. Additionally, or alternatively, monitoring center application server 505 may provide requested surveillance information to a user of user device 115, e.g., as a live or real-time video/audio stream, as a downloaded media file corresponding to a particular period of time or occurrence of an event, etc.

Furthermore, in response to the received surveillance information, monitoring center application server 505 may identify security or event policy rules based on the received information, and provide instructions or commands based on the applied rules. In other implementations, monitoring center application server 505 may be configured to identify security actions for application based on other techniques, such as if-then processing, etc.

Monitored information database 510 may include a database or another data structure to store data pertaining to a receive surveillance information. Monitored information database 510 may store, for example, media data, location data, and sensor data associated with monitored locations 105.

Regarding the individual components of monitoring center application server 505, registration component 515 may include logic configured to receive, from an authorized user, information relating to the establishment of monitored locations 105, such as identification and registration of particular surveillance devices 205, and creation or association of user accounts with monitored locations 105. In some embodiments, registration component 515 may be configured to establish user privileges or priorities with respect to user accounts and monitored locations 105, user devices 215, and/or surveillance devices 205. For example, a particular user account may be created and associated with a monitor role for a particular monitored location 105, while a different user account may be created and associated with a field agent role for a particular monitored location 105. As described above, user device 115 may be affiliated with the monitor role and user device 215 may be affiliated with the field agent role. A specific example of processing associated with creating user accounts, establishing a monitored location, and/or registering surveillance devices 205 is described below with respect to FIG. 8.

Referring to account types and privileges associated with monitoring center 110 and user devices 115/215, user accounts may be provided with different security or administrator privileges, such as users, monitors, field agents, administrators, managers, customers, etc. Each privilege level may be configured to provide different levels of viewing/administrative access.

For example, administrator users may be permitted to setup new accounts and assign surveillance devices 205. Such administrator accounts may be controlled from monitoring center 110 or via a user device 115. In addition, administrator accounts may be permitted to create or edit monitored locations 105, establish virtual perimeter (e.g., location-based information used to generate alerts or notifications). Administrator users can also escalate or clear alerts or notifications and escalate a status or alert associated with monitored locations 105. In another embodiment, administrator accounts may be enabled to transmit broadcast messages to surveillance devices 205 and/or user devices 215 (i.e., field agent devices).

A manager account level may be provided with similar access to that of an administrator, however such access may be limited to a particular monitored location 105 or a set of monitored locations 105.

A customer account level may be provided with a same authority as a manager account, except that customer accounts may not be permitted to create additional customer accounts. Customer accounts may be used by large corporations that want to monitor their own network of monitored locations 105 or surveillance devices 205.

A parent/homeowner account level may be created and assigned to individuals that want to privately monitor select surveillance devices 205, but want another party (e.g., service provider) to set up the account, establish alert criteria, and monitor alarm conditions, etc. Parents, homeowners, and celebrities may want this type of account. Once setup, this level of account may restrict other roles from monitoring video/audio from the surveillance devices.

Because these are private or very individualized types of accounts, stored media or other surveillance information may be maintained in local storage 210, with data being transmitted to monitoring center 110 only in the event of a triggering event. When such a triggering event happens, i.e., intrusion detection, accident, perimeter (e.g., location-based) violation, etc., surveillance data (e.g., a video feed from surveillance device 205) may be transmitted to monitoring center 110 to capture what is happening. Once this occurs, administrator/manager level accounts may have access to the surveillance data for subsequent event handling responsibilities. In the event of a false alarm, parent/owner accounts may be able to delete the surveillance from monitoring center 110, thus ensuring that personal surveillance data is not outside of their control.

Returning to FIG. 5, data ingest engine 520 may be configured to receive surveillance data from one or more of surveillance devices 205, local storage 210, and/or user device 215 (also referred to as field agent device 215). As briefly described above, surveillance devices 205 may be configured to transmit surveillance data (e.g., audio, video, location, or sensor data), in substantially real time, to data ingest engine 520 as a real time feed or stream. Alternatively, surveillance devices 205 may be configured to store surveillance data in local storage 210 for transmission to data ingest engine 520 periodically, or upon request, e.g., by a user device 115 associated with an authorized account.

Once received, data ingest engine 520 may be configured to pass some or all of the surveillance data to surveillance monitoring interface logic 530 and event determining logic 540 for user monitoring and event determination. In some implementations, data ingest engine 520 may be configured to store some or all of the received surveillance data in monitored information database 510. For example, in some embodiments, data ingest engine 520 may store all received surveillance data in monitored information database. Alternatively, in other embodiments, only surveillance data received after the identification of an event, or a particular kind of event may be stored for later retrieval and review.

Field agent interface logic 525 may be configured to provide an interface for receiving information from a field agent device 215. For example, as described above, field agent devices 215 may be associated with a monitored location 205. Field agent interface logic 525 may interface with field agent devices 215 to receive status or alert information from a field agent user. In some embodiments, field agent interface logic 525 may be accessed by field agent device 215 executing a field agent application associated with monitoring center application server 505.

Consistent with embodiments described herein, field agent interface logic 525 (e.g., via the field agent application on field agent device 215) may provide field agents with a listing of predefined or preset updates identifiers and/or the ability to provide a custom status update. Field agents may select or enter a particular update identifier that may be used by monitors and administrators/managers to quickly and accurately ascertain update information associated with a monitored location 105 or a particular surveillance device 205.

Figure 6:
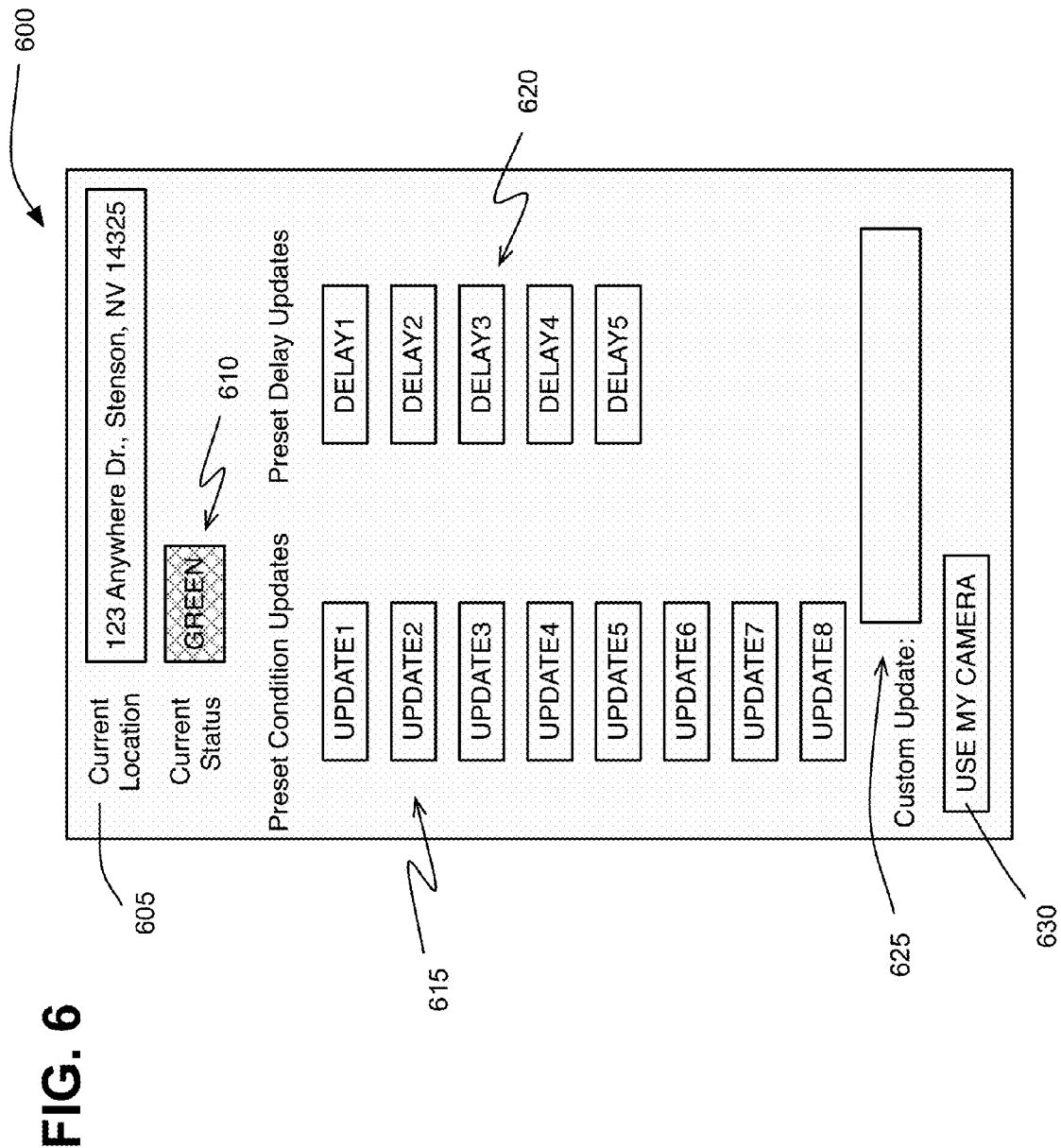
FIG. 6 is an exemplary user interface associated with the field agent interface logic of FIG. 5.

FIG. 6 is an exemplary user interface 600 associated with field agent interface logic 525, for example, as presented by a field agent application executing on field agent device 215, as described above. As shown, user interface 600 includes several elements including current location information 605, current status information 610, a group of preset condition update identifiers 615, a plurality of delay update identifiers 620, a custom update entry field 625, and a use my camera option 630.

Consistent with embodiments described herein, current location information 605 may indicate a current location associated with a particular surveillance device 205 with which the field agent is associated. The information in field 605 may be populated based on information received from monitoring center 110, or, alternatively, the information in field 605 may be populated based on a location of field agent device 215 on which interface 600 is executing.

Current status information 610 indicates a current status of the monitored location 105. In some implementations, current status information 610 may be color-coded to reflect the status of monitored location 105 in view of security rules associated with monitored location 105. For example, a lack of identified security events or alerts, or events/alerts have low levels of importance may be reflected as a green status; a yellow status may reflect that at least one moderate security event has been identified; and a red status may reflect that a severe or important security event has been identified with respect to the monitored location 105 or surveillance device 205.

A field agent user may select one of the group of preset condition update identifiers 615 to transmit the update to monitoring center 110 for display to monitors or administrators. Such preset condition updates may be tailored to the particular type of monitored location or surveillance device and may include, for example, an update to request assistance, to sound an alarm, indicative of a temporary stop, normal status, etc. Delay update identifiers 620 may indicate delays associated with, for example, a moving location, such as a delivery vehicle, a train, etc. and may indicate delays in preset increments like 15 minutes, 30 minutes, etc.

Custom update entry field 625 permits field agents to input custom text to more accurately identify an update corresponding to monitored location 105 or monitored device 205, when preset identifiers 615/620 are either not sufficiently descriptive or are inapplicable to the observed update information.

Use my camera option 630 permits the field agent to temporarily replace a media feed associated with a particular surveillance device 205 with a camera feed from field agent device 215. For example, assume that surveillance device 205 is a passenger compartment facing surveillance camera in a taxi cab. In some instances, field agent (e.g., the taxi driver) may wish to replace the video feed from the passenger compartment facing surveillance camera with a camera feed from field agent device (e.g., his smart phone) to allow a monitor or administrator to view otherwise unviewable information, such as a flat tire, traffic conditions, etc.

Returning to FIG. 5, surveillance monitoring interface logic 530 may be configured to provide an interface for viewing surveillance information associated with one or more surveillance devices 205 or monitored locations 105. For example, as described above, user devices 115 may access surveillance data from monitoring center 110 via network 120 (e.g., the Internet). Surveillance monitoring interface logic 530 may interface with user devices 115 (e.g., computers, tables, smart phones, etc.) to receive and monitor surveillance data relating to associated monitored locations 105. In some embodiments, surveillance monitoring interface logic 530 may be accessed by user devices 115 executing a surveillance application associated with monitoring center application server 505 or via a web-based interface hosted by monitoring center application server 505.

Consistent with embodiments described herein, surveillance monitoring interface logic 530 may provide authorized users with access to media or surveillance feeds corresponding to one or more surveillance devices 205 at one or more monitored locations 105. In some implementations, the surveillance feed information is provided to users in substantially real time. In addition to surveillance data from surveillance devices 205, surveillance monitoring interface logic 530 may also provide users with status and security event information and alerts, as described below in relation to event rule creation logic 540, event occurrence determining logic 545, and event response logic 550.

Figure 7A:
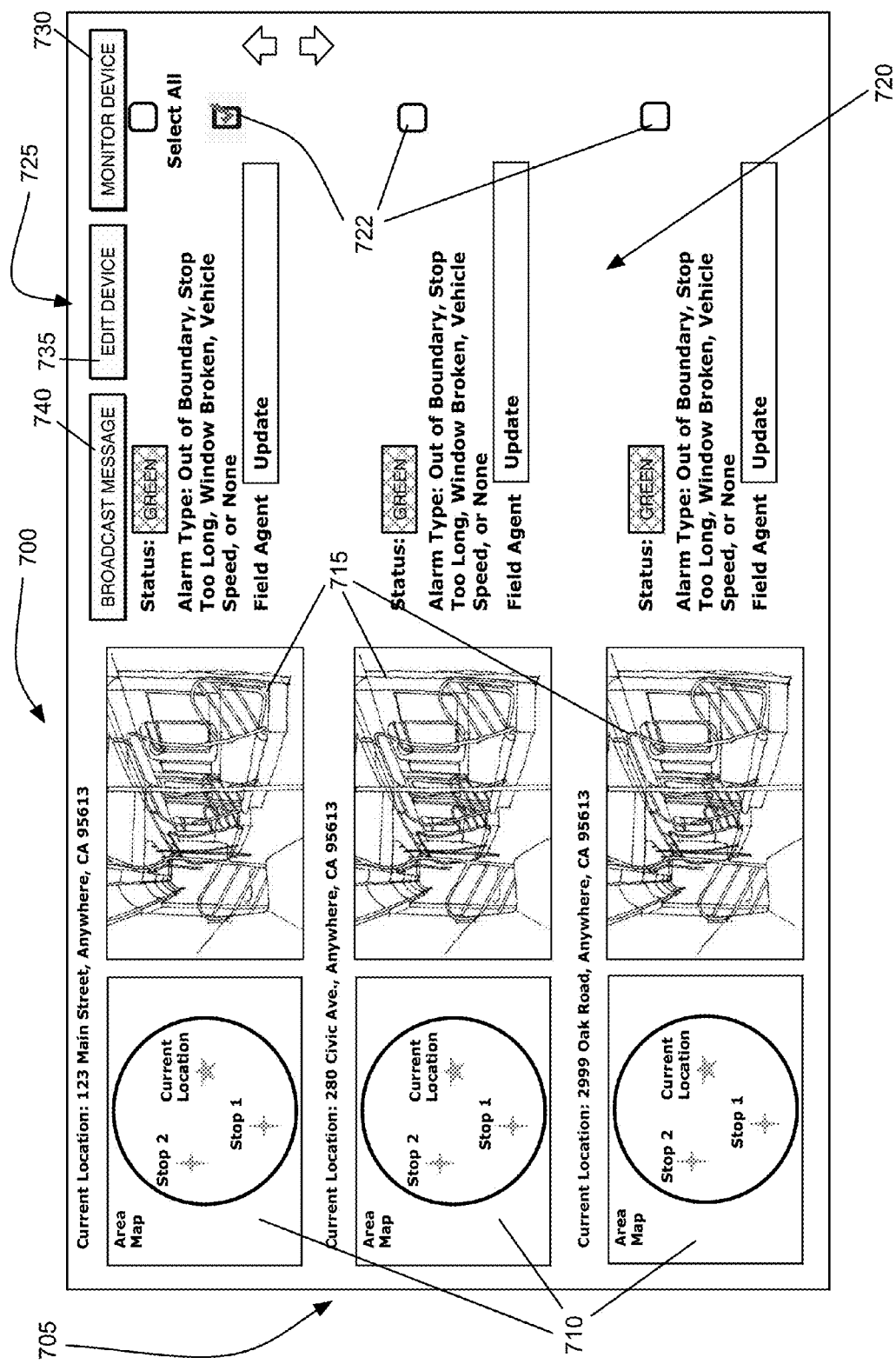

FIG. 7A is an exemplary user interface 700 associated with surveillance monitoring interface logic 530, for example, as presented by a surveillance monitoring application or web-based portal executing on user device 115, as briefly described above. As shown, user interface 700 may include a listing 705 of surveillance devices 205 that are available for monitoring by a current user. Each entry in listing 705 may include overview information corresponding to the particular surveillance device 205 in the entry including, for example, location information for the surveillance device 205, status/alert information for the surveillance device 205. Furthermore, each entry in listing 705 may be individually selected for more detailed monitoring, such as live video/audio streaming, camera manipulation, etc., as shown and described with respect to FIG. 7B.

In the example shown in FIG. 7A, each entry in listing 705 includes a map 710 illustrating a location of the surveillance device 205 corresponding to the entry. In some embodiments, map 710 may include additional information relating to event handling for the security device, such as scheduled arrival locations, perimeter monitoring information (e.g., an outline of a permitted perimeter), etc. Each entry in listing 705 may also include a thumbnail or snapshot 715 of the surveillance video feed available from surveillance device 205 that may be used to select an appropriate surveillance device for live or real-time monitoring.

As shown in FIG. 7A, the entries in listing 705 may also include a status and update information section 720 that includes a representation or indication of the current alert or event status corresponding to the surveillance device 205 and any field agent provided updates. As discussed briefly above, in some embodiments, alert or event status information may be color-coded to enable efficient identification of security events that may warrant individual monitoring or event handling.

User interface 700 may include a number of control options 725 including a monitor device option 730, an edit device option 735, and a broadcast message option 740. Further, each entry in listing 705 may include a selection box 722 for receiving a user selection of whether to include a selected surveillance device 205 when selecting one of control options 725.

Figure 7B:
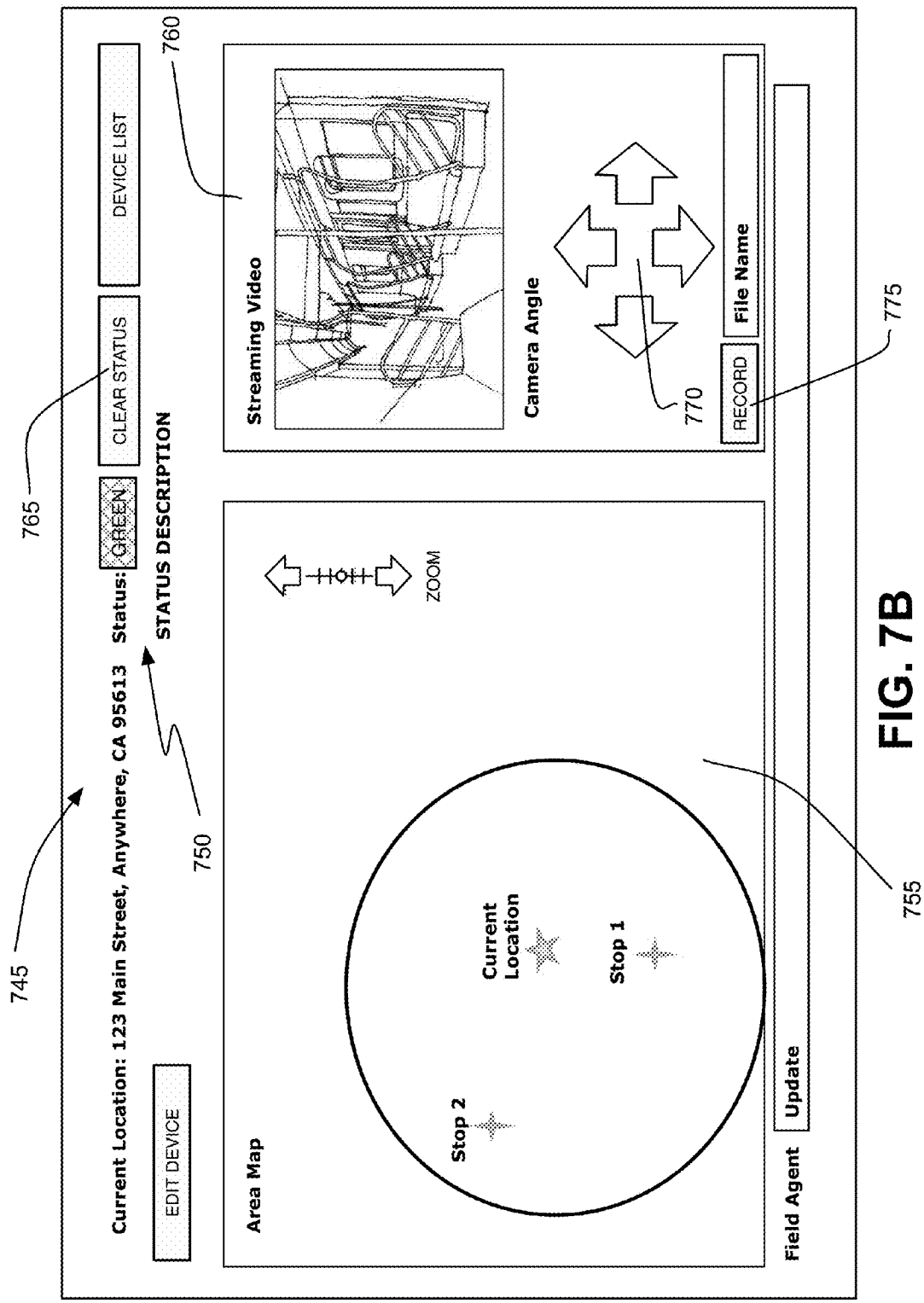

Selection of monitor device option 730 causes user device 115 to output a user interface 745, as shown in FIG. 7B, that includes enhanced surveillance or monitoring information regarding the selected surveillance device or devices 205. In particular, as shown in FIG. 7B, user interface 745 may include a status information section 750, a live updating location section 755, and a surveillance feed section 760.

Status information section 750 may include information similar to status and update section 720 in interface 700. More specifically, status information section 750 may include an indication of the current alert or event status corresponding to the surveillance device 205 and any field agent provided updates. In some implementations, interface 720 may provide an option 765 for allowing an authorized user (e.g., administrator or manager level user) to clear or remove an alert.

Consistent with embodiments described herein, live updating location section 755 is configured to display a continuously updated geographic location of the selected surveillance device 205 as well as any location-related information having a bearing on the monitoring of surveillance device 205, such as an indication of scheduled stops for the device, a geofence or virtual perimeter defined for the device, etc.

Surveillance feed section 760 may include a live or substantially real time stream, when available, received from the particular surveillance device 205 being monitored. As shown in FIG. 7B, in some embodiments, and where the device supports such functionality, surveillance feed section 760 may include camera controls 770 for enabling a user to pan and zoom the feed image. As shown, surveillance feed section 760 may include an option 775 for allowing a user to save a copy or version of the surveillance feed information locally on user device 115 for subsequent review.

Returning to FIG. 7A, selection of edit device option 735 causes user device 115 to output a user interface (not shown) that includes options and settings for editing configurations and event rules for selected surveillance devices 205. For example, a user may establish a perimeter, define location schedules, set sensor thresholds, etc.

Selection of broadcast message option causes user device 115 to output a broadcast message user interface 780 as shown in FIG. 7C, that includes options and inputs for enabling users to format and transmit broadcast messages to one or more selected surveillance devices 205 or field agent devices 215.

As shown in FIG. 7C, consistent with embodiments described herein, broadcast message user interface 780 includes a pre-recorded message option 782, a text to speech message option 784, and a live broadcast option 786. Pre-recorded message option 782 provides the user with a listing of different pre-recorded broadcast messages, e.g., as a drop down menu 788 or similar interface element. Examples of such messages may include "Please stay calm, emergency assistance has been notified," "Please advise as to cause of your delay," or "Leave the premises immediately." Upon selecting one of the provided messages, the user may select the send option 790 to cause the message to be transmitted as an audio message (e.g., an audio file or audio stream by broadcast message logic 535) to the selected surveillance devices 205 or field agent devices 215.

Text to speech message option 784 provides the user with a text entry box 792 for permitting user entry of a desired message. In a touch screen or smart phone embodiment, an onscreen keyboard may appear on user interface 780 upon selection of text entry box 792. Once a user has entered (and possible edited) the message in text entry box 792, the user may select the send option 794 to cause the text to be converted into an audio speech message and transmitted (e.g., as an audio file or audio stream by broadcast message logic 535) to the selected surveillance devices 205 or field agent devices 215.

Live broadcast message option 786 may include a record button 796. Upon selection of record button 796, a microphone in user device 115 may receive a spoken voice message from the user. The received spoken message may be converted into an audio stream for transmission to the selected surveillance devices 205 or field agent device 215.

It should be understood that the user interfaces depicted in FIGS. 7A-7C are exemplary only and the content of such interfaces would vary depending on the type of surveillance devices being used, the type of monitored location or monitored system, etc.

Returning to FIG. 5, broadcast message logic 535 may be configured to receive information from a user, such as a monitor user or administrative/manager user that is broadcast either audibly or visually via one or more surveillance devices 205. For example, in one embodiment, surveillance monitoring interface logic 530 may be configured to receive a broadcast message from an authorized user, such as pre-recorded broadcast messages, text input messages for conversion to audio messages, or a live audio streamed message, as described above in relation to FIG. 7C. Broadcast message logic 535 may then be configured to transmit the message to selected surveillance devices 205 or field agent devices 215 associated with the selected surveillance devices via network 120 and/or local network 220, e.g., as a media file, or a media stream. Upon receipt of the broadcast message, the selected surveillance devices 205 or field agent devices 215 are configured to output the broadcast message to nearby individuals or field agents. This capability may be particularly useful for providing warnings or instructions to the field agents. Furthermore, the broadcast message capability, when taken in context with the field agent update capabilities described above with respect to field agent interface logic 525, described above, may effectively provide real-time or substantially real-time two way communications between monitors and personnel in proximity with surveillance devices 205.

Event rule creation logic 540 may be configured to receive user (e.g., administrator) created rules for identifying the occurrence of events and for establishing an event level or action to take in response to the occurrence of events. For example, depending on the type of monitored location 105 and surveillance devices 205, different surveillance data may form the basis for different types of event rules. Consistent with embodiments described herein, surveillance monitoring interface logic 530 may include an interface for receiving rule definition information from a user.

By way of example, assume that monitored location 105 is a bus and includes a single surveillance device 205. Event rule creation logic 540, e.g., via surveillance monitoring interface logic 530, may receive (e.g., from administrator or manager level users) criteria for determining when an event has occurred that may result in a change of status or may cause an alert or notification to be generated. For example, such criteria may include indications of a planned route for the bus, identifications of addresses or locations corresponding to scheduled stops, permissible maximum (or minimum) stop times for each stop, etc. In addition to route or delay-based information, the criteria may also include vehicle information, such as a maximum allowable speed, etc.

In addition to the criteria, in some embodiments, rule creation logic 540 may also receive action information for each rule, such as alerts to generate, status to update, notifications to send, authorities (e.g., police, fire, ambulance) to dispatch, etc. In this manner, administrators may leverage the capabilities of the surveillance device(s) 205 to communicate information to surveillance monitors in an expeditious manner and further allow the monitors to, upon receipt of an alert or notification, view or listen to a live (or substantially live) media stream corresponding to the event or the monitored location 105/surveillance device 205.

The received event rules may be stored, for example, in monitored information database 510 or other storage associated with monitoring center 110. In other implementations, such as for customer/homeowner accounts, the event rules may be stored on local storage 210, user device 215, or surveillance devices 205 themselves at monitored location 105. In such implementations, because surveillance data is only transmitted following event determination, event determination necessarily takes place at monitored location 105, rather than at monitoring center 110.

Event determining logic 545 may be configured to receive surveillance data from surveillance devices 205 and identify the occurrence of events based on the received surveillance data and one or more event rules created by event creation logic 540 and stored, for example, in monitoring information database 510. For example, as described briefly above, event determining logic 545 may receive geographic location information corresponding to a physical location of a particular surveillance device 205. Event determining logic 545 may compare the received location information to the event rules corresponding to the particular surveillance device 205 to determine whether an event is occurring, such as an unexpected delay, an out of perimeter event, a breakdown or accident, a field agent initiated event, etc. In other implementations, surveillance device 205 may include one or more temperature sensors, light sensors, proximity sensors, motion sensors, etc. received information from which may be compared to threshold sensor values to determine whether an event has occurred or is occurring.

Event determining logic 545, based on the received surveillance data, may be configured to generate event information. In some embodiments, as described briefly above, events may be categorized based on severity or importance, with some events being assigned a lower severity or importance than other events. For example, green level events may be low severity, yellow events may be middle severity, and red events may be high severity. The event rules created by event rule creation logic 540 may be defined to indicate handing instructions for identified events based on such categorizations. As described herein, identified events may be assigned an event type identifier associated with the identified event. Exemplary event type identifiers may include: unscheduled stop, exceeded stop time, accident, intruder detected, power outage, medical emergency, geofence exceeded, etc. Event determining logic 545 may be configured to identify the occurrence of one or more events based on the received surveillance data and initiate any actions corresponding to the event determination.

Upon identification of an event by event determining logic 545, event response logic 550 may be configured to retrieve the identified actions from any matching event rules and initiate execution of the action(s). For example, upon identification of an applicable event rule, e.g., by event determining logic 545, event response logic 550 may cause transmit an alert notification to one or more monitor users, such as via email message, text message, application push message, etc. Such notifications inform users that the surveillance data corresponding to the event should be monitored. In other embodiments, event response logic 550 may cause a status of the corresponding surveillance device 205 or monitored location to be changed (e.g., escalated). In still other embodiments, event response logic 550 may cause third parties to be notified, such as emergency response personnel, when an accident or crime related event is determined.

In some implementations, actions taken by event response logic 550 may be overridden or cleared by a user, such as an administrative user. Upon receipt of an authorized override or clearing request, event response logic 550 may attempt action execution periodically until a threshold number of attempts (e.g., 5 attempts) has been made, following which actions are executed regardless of user interaction, when it is determined that the event condition persists.

The functional blocks illustrated in FIG. 5 may be implemented in software, hardware, a combination of hardware and software. In alternative implementations, some or all of the components illustrated in FIG. 5 may be implemented in other devices or combinations of devices, such as surveillance device 205, field agent device 215, or user devices 115, and/or other devices (e.g., firewalls, access points, routers, etc.). Various logic components illustrated in FIG. 5 may be implemented by processor 320 executing one or more programs stored in memory 330. In some implementations, one or more components of FIG. 5 may be implemented in other devices associated with monitoring center 110. In addition, monitoring center application 505 may include a single or more than one executable application.

Figure 8:
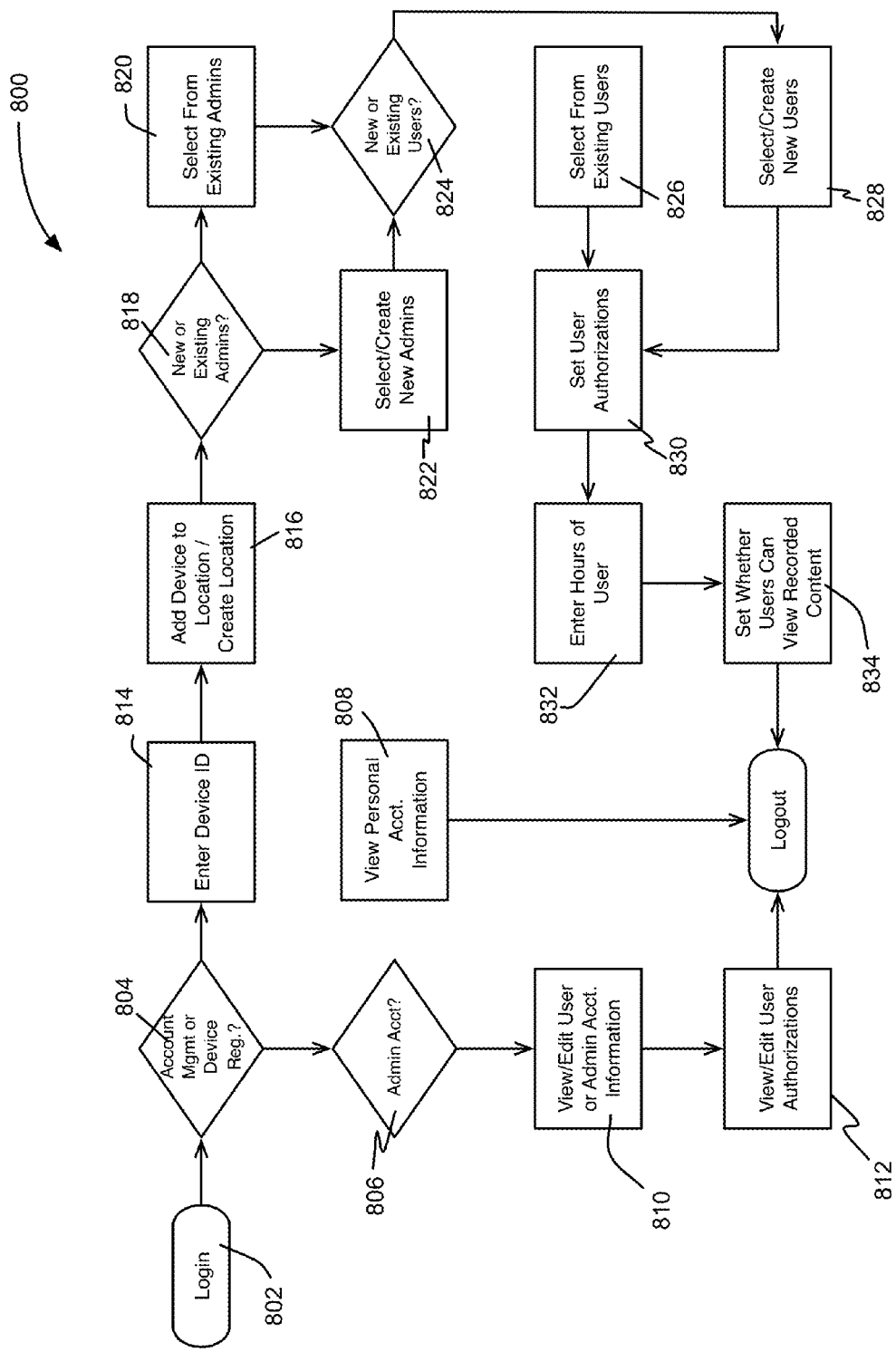
FIG. 8 is a flow diagram illustrating exemplary processing associated with configuring a monitored location, registering a surveillance device, and/or creating user accounts, consistent with embodiments described herein.

FIG. 8 is a flow diagram illustrating an exemplary process 800 for configuring a monitored location 105, registering a surveillance device 205, and/or creating user accounts consistent with embodiments described herein. Processing may begin with monitoring center 110 receiving a user login (block 802). For example, monitoring center application server 505 may receive login information via an application or web-based interface executing on user device 115 or field agent device 215.

Next, monitoring center application server 505 determines whether the user wishes to define a new surveillance device or monitored location or manage user permissions and privileges (block 804). When it is determined (block 804—ACCOUNT) that the user wishes to manage and account or user privileges (e.g., by receiving a user selection of an icon, link, etc.), monitoring center application server 505 determines whether the user is an administrator or manager-level user (block 806). For example, registration component 515 may compare the received user login information against a database of users to determine privileges or an account level associated with the user.

When it is determined that the user is not an administrator (block 806—NO), registration component 515 may be configured to retrieve a user's account information and display the information to the user (block 808). Although not shown in FIG. 8, in some embodiments, users may be provided with an ability to modify or update aspects of their account information, such as contact information, passwords, etc.

When it is determined that the user is an administrator-level user (block 806—YES), registration component 515 may be configured to retrieve information regarding other users and administrators and enable the user to edit information corresponding to their own account or the accounts of the other users (block 810). Also, the user is provided with the options that enable modification of authorizations or privileges corresponding to the users with whom the administrator user is associated (block 812).

Returning to block 804, when it is determined that the user wishes to create a new monitored location 105 and/or register a new surveillance device 205 (block 804—DEVICE), registration component 515 may receive an identifier associated with the new surveillance device 205 (block 814). For example, registration component 515 may receive a serial number or inventory control number associated with a particular surveillance device 205.

Next, an identification of an existing monitored location 105 or information regarding a new monitored location 105 may be received (block 816). For example, registration component 515 may receive a user selection of a particular monitored location 105 with which to associate the new surveillance device 205. Alternatively, registration component 515 may receive an identification of a new monitored location 105 to be created that includes the new surveillance device 205.

In block 818, it is determined whether administrators or groups of administrators associated with the surveillance device 205 are selected from a listing of existing administrators or administrator groups or whether new administrators or administrator groups are to be defined for the new surveillance device 205. If existing administrators/groups are to be assigned (block 818—EXISTING), the user is provided with a listing of administrators or groups of administrators and selected ones are associated with the new surveillance device 205 (block 820). However, if a new administrator or administrator groups is to be created and assigned to surveillance device 205, (block 818—NEW), identification information regarding the new administrator or group of administrators may be received (block 822).

Next, it may be determined whether new or existing monitoring users are to be associated with the user (block 824). If existing monitoring users are to be assigned (block 824—EXISTING), the user is provided with a listing of available monitoring users and selected ones are associated with the new surveillance device 205 (block 826). However, if a new monitoring user is to be created and assigned to surveillance device 205, (block 824—NEW), identification information regarding the new monitoring user may be received (block 828).

At block 830, authorizations for the selected/created users may be established. For example, registration component 515 may receive, for each selected/created user, an identification of assigned privileges or authorizations. Next, at block 832, an indication of the hours of use may be provided for each user and, at block 834, an indication of whether each user can view recorded content or only live or real time content may be received.

FIG. 9 is a flow diagram illustrating an exemplary process 900 for implementing a surveillance monitoring and event response system consistent with embodiments described herein. Processing may begin with monitoring center 110 receiving surveillance data from one or more surveillance devices 205 (block 902). For example, in one embodiment surveillance device 205 may include a mobile surveillance camera configured to transmit real time or live video data and location information to monitoring center 110 via access network 120.

Monitoring center 110 may identify an event condition based on the received surveillance data (block 904). For example, as describe above with respect to FIG. 5, event determining logic 545 may compare received surveillance data (e.g., location data, time data, sensor data, image/video/audio data, etc.) with one or more event rules created with event rules creation logic 540. In other implementations, event determining logic 545 may determine an occurrence of an event condition based on information received from a field agent user via field agent device 215 associated with a monitored location 105 and one or more surveillance devices 205.

Based on the event rule(s) associated with the identified event condition, monitoring center 110 may initiate one or more responses to the event condition (block 906). For example, event response logic 550 may be configured to cause alerts, alarms, or notifications to be sent to user devices 115, field agents 215, and/or third parties (e.g., law enforcement/emergency services personnel) informing of the event condition and providing a view/information relative to the event condition, such as a view of a live camera stream from the affected surveillance device 205, data regarding the event (e.g., overlong delay, accident detected, sensor readings, etc.). As described above, in some embodiments, the alert or notification information may be transmitted to user devices 115/215 via network 120 (e.g., the Internet) or via a proprietary access network.

In response to the notification, monitoring center 110 may receive a user request to view information associated with the identified event condition (block 908). For example, a user may log into surveillance monitoring interface logic 530 (e.g., via an application on user device 115, a web-based interface, etc.) and view the surveillance information corresponding to the event condition. In some embodiments, a color-coded status identifier may be associated with each surveillance device 205 associated with a user. Thus, when viewing a listing of surveillance devices 205, those having event conditions or other alerts are easily identified.

Monitoring center 110 may receive a user request to view a live media stream corresponding to any associated surveillance device 205 (block 910). For example, surveillance monitoring interface logic 530 may receive a user selection to monitor a particular surveillance device 205 from among the listing of associated surveillance devices 205. In response, at block 912, monitoring center 110 may provide forward the requested media stream to the user, where possible. In the event that a live media stream is not available, the user may be provided with the option to review the most recently recorded media corresponding to the selected surveillance device 205. In one embodiment, the surveillance monitoring interface logic 530 may be configured to alert the user when the live media stream for the selected surveillance device 205 is available.

At block 914, monitoring center receives a user request to generate a broadcast message to one or more selected surveillance devices 205. For example, surveillance monitoring interface logic 530 may receive a user selection of a broadcast message option. Furthermore, surveillance monitoring interface logic 530 may receive, from the user, an indication of the content of the broadcast message to be transmitted. In some embodiments, as described above with respect to FIG. 7C, users may select, via surveillance monitoring interface logic 530, from among a number of pre-recorded broadcast messages, or may select to record or input a new or custom broadcast message.

Once the content of the requested broadcast message has been defined, monitoring center 110 may output the broadcast message to the selected surveillance devices 205 via network 120 (block 916). In one implementation, the broadcast messages may be transmitted as audio recordings for output by speakers at the selected surveillance devices 205. This feature may provide monitoring users with the ability to interact with individuals present in or around the monitored location 105 in which the selected surveillance devices 205 are located. In an alternative implementation, broadcast messages may be received directly from a microphone of user device 115 and transmitted/forwarded to the selected surveillance devices 205 as a media stream.

By way of example, the following use cases are provided as descriptive of the ways in which the above-described embodiments may be implemented. In a first use case, monitored location 105 includes a public transportation system (i.e., trains, buses, ferries) having a number of standardized routes and schedules. Surveillance devices 205 associated with such systems may include mobile (e.g., vehicle-based) surveillance cameras. As described herein, provided a mobile surveillance system may protect riders and may assist security services, police, or system operators in monitoring activities within the public transportation system. Identified security or safety events can be tracked live and law enforcement or emergency services authorities can be deployed to the location immediately upon event determination.

In a second use case, monitored location 105 includes any temporary or nomadic safety/security environment. Such environments include, for example, day or overnight children's camps, field trips, motorcade or parade routes, taxi cabs, transport services (e.g., delivery vehicles, armored vehicles), mobile food vendors, etc. Surveillance devices 205, such as mobile video cameras, can be provided in the temporary or mobile environment can provided monitors (e.g., parents in the childrens camp or field trip example) with information regarding the security and safety of the mobile environment.

As described above, in some embodiments, individuals associated with the mobile environment (e.g., teachers, drivers, security personnel, etc.) may act as field agents and may be provided with a filed agent device 215 for providing updates or notifications to monitor user devices 115 or to monitoring center 110.

In a continuation of this use case scenario, additional surveillance devices 205 may include location-based devices, such as GPS devices that can provide specific location information for items or participants associated with the environment. For example, students on the field trip may be provided with GPS devices that provide live updating location information for the students to monitoring center 110. Authorized users, such as parents of a particular student, can view the location information for their child. In addition, event rules may be configured to generate alerts, alarms, or notifications based on the location information, including relative location information (e.g., proximity to a mobile surveillance device 205 or other user device) and absolute location information (e.g., latitude/longitude, or street address). The rules may be configured to transmit the alerts or notifications to designated users, such as parents, camp counselors, etc.

Implementations described herein relate to devices, methods, and systems for providing surveillance and monitoring capabilities in mobile and dynamic environments. In one implementation, mobile surveillance devices 205 may be configured to transmit real time or live media feeds to a monitoring center 110 via an access network, such as a cellular (e.g., LTE) communications network. Monitoring center 110 may apply event rules to automatically determine when surveillance events are occurring at one or more surveillance devices 205. When an event is determined, an action specified or defined in the event rule may be executed to, for example, alert or notify monitor users or third parties regarding the event as it is occurring. Monitoring center 110 provides an interface for enabling users to view the surveillance information from surveillance devices 205 in response to an event notification or alert, or at any other time.

In some implementations, monitoring center 110 may facilitate communication between users and monitored locations 105 by enabling users to create and transmit broadcast messages to selected surveillance devices 205. The surveillance devices 205 are configured to output the received broadcast messages (e.g., audibly or visibly) to alert nearby individuals or personnel regarding actions being taken or instructions to follow.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of blocks have been described with respect to FIGS. 8 and 9, the order of the blocks may be varied in other implementations. Moreover, non-dependent blocks may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving, via a mobile access network, surveillance data from one or more mobile surveillance devices, wherein the one or more mobile surveillance devices are associated with a monitored location, system, or group;
   receiving, via the mobile access network, a field agent update from a field agent device associated with at least one of the one or more mobile surveillance devices, wherein the field agent device is different from the one or more mobile surveillance devices,
   wherein the field agent update is received via a field agent interface executing on the field agent device, and
   wherein the field agent interface comprises an option to use a camera device of the field agent device to replace a media feed associated with the at least one of the one or more mobile surveillance devices;

receiving, from the field agent device, a user selection of the option to use the camera device of the field agent device;

receiving a media stream from the camera device of the field agent device;

including the media stream from the camera device of the field agent device with the surveillance data of the at least one of the one or more mobile surveillance devices;

identifying an event condition associated with the monitored location, system, or group based on the received surveillance data or the field agent update, wherein the event condition corresponds to at least one of the one or more mobile surveillance devices or the field agent device;

generating an alert notification based on the identified event condition;

transmitting the alert notification to one or more user devices based on the event identified condition;

receiving a request to view at least a portion of the surveillance data from a user device in response to the alert notification; and transmitting at least the portion of the surveillance data to the user device in response to the request.

2. The computer-implemented method of claim 1, wherein the surveillance data includes at least location information for the one or more mobile surveillance devices, and wherein the event condition comprises a location-based event condition or a time and location-based event condition.

3. The computer-implemented method of claim 1, wherein the one or more mobile surveillance devices comprise mobile video cameras, and wherein the surveillance data includes at least video feed information.

4. The computer-implemented method of claim 1, wherein the field agent update information is provided to the user device with the portion of the surveillance data.

5. The computer-implemented method of claim 1, further comprising:

receiving, from the user device, a request to transmit a broadcast message to selected ones of the one or more mobile surveillance devices; and transmitting the broadcast message to the selected ones of the one or more mobile surveillance devices via the mobile access network, wherein receipt of the broadcast message by the selected ones of the one or more mobile surveillance devices causes the selected ones of the one or more mobile surveillance devices to audibly output the broadcast message.

6. The computer-implemented method of claim 1, wherein the at least the portion of the surveillance data transmitted to the user device comprises a color-coded status identifier visually indicating a status of the monitored location or the at least one of the one or more mobile surveillance devices.

7. The computer-implemented method of claim 1, wherein identifying the event condition associated with the monitored location, system, or group based on the received surveillance data further comprises:

receiving, from an administrator user, at least one event rule relating to the one or more mobile surveillance device, wherein the at least one event rule defines an event condition based on criterion included in the surveillance data, and wherein the at least one event rule defines a response to be taken when the event is identified; and identifying the event condition by comparing the received surveillance data against the criterion in the at least one event rule.

8. The computer-implemented method of claim 7, wherein the event rule defines a first event condition as occurring when the surveillance data indicates that the at least one of the more than one mobile surveillance devices is in a location beyond a predetermined location for a period of time beyond a predetermined period of time.

9. The computer-implemented method of claim 1, wherein the monitoring center comprises an application server configured to receive information from and transmit information to the one or more mobile surveillance devices and the user device.

10. The computer-implemented method of claim 1, further comprising storing the received surveillance data for subsequent retrieval and review.

11. The computer-implemented method of claim 1, further comprising storing the received surveillance data, following the identification of the event, for subsequent retrieval and review.

12. The computer-implemented method of claim 1, wherein the surveillance data is received in real time.

13. The computer-implemented method of claim 1, wherein the surveillance data is initially stored at the monitored location and is received by the monitoring center periodically or during periods of increased access network bandwidth or performance.

14. The computer-implemented method of claim 1, wherein the surveillance data is initially stored at the monitored location, wherein the identifying the event condition is performed by a device at the monitored location, wherein, when the event condition is identified, the surveillance data corresponding to the event condition is received, by a monitoring center, via the mobile access network, and wherein the monitoring center generates the alert notification based on the identified event condition and the received surveillance data.

15. The system of claim 1, wherein the second processor of the monitoring center is further configured to:

identify an event condition associated with the mobile surveillance device by comparing the received surveillance and location information or the field agent update with the number of event rules;

generate an alert notification based on the identified event condition; and transmit the alert notification to the monitor user device via the computer network based on the event identified condition.

16. A system for monitoring a location or system device, comprising:

a mobile surveillance device having at least a first processor configured to capture surveillance and location information for the mobile surveillance device;

a monitoring center coupled to the mobile surveillance device via a mobile access network, wherein the monitoring center includes a second processor configured to:

store a number of event rules associated with the mobile surveillance device that define a number of event conditions, wherein the number of event rules define response actions to be performed upon identification of the event conditions;

receive the surveillance and location information from the mobile surveillance device;

receive a field agent update from a field agent device associated with the mobile surveillance device, wherein the field agent device is different from the mobile surveillance device, wherein the field agent update is received via a field agent interface executing on the field agent device;

receive, from the field agent device, a user selection of an option to use a camera device of the field agent device to temporarily replace a media feed associated with the mobile surveillance device;

receive a media stream from the camera device of the field agent device;

include the media stream from the camera device of the field agent device with the surveillance and location information from the mobile surveillance device;

receive a request to view at least a portion of the surveillance and location information or the field agent update from a monitor user device connected to the monitoring center via a computer network;

determine whether the monitor user device is authorized to receive the at least the portion of the surveillance and location information or the field agent update;

transmit the at least the portion of the surveillance and location information to the monitor user device via the computer network when the monitor user device is authorized to receive the at least the portion of the surveillance and location information;

receive, from the monitor user device, a request to record the at least the portion of the surveillance and location information; and record the at least the portion of the surveillance and location information based on the request.

17. The system of claim 16, wherein the second processor in the monitoring center is further configured to:

receive, from the monitor user device, a request to transmit a broadcast message to the mobile surveillance device; and transmit, to the mobile surveillance device, the broadcast message via the mobile access network; and wherein the first processor in the mobile surveillance device is further configured to:

receive the broadcast message from the monitoring center; and audibly output the broadcast message via a speaker.

18. The system of claim 16, wherein the at least the portion of the surveillance and location data transmitted to the monitor user device comprises a color-coded status identifier visually indicating a status of the mobile surveillance device.

19. A non-transitory computer-readable memory device having stored thereon sequences of instructions which, when executed by at least one processor, cause the at least one processor to:

receive, via a mobile access network, surveillance data from one or more mobile surveillance devices, wherein the one or more mobile surveillance devices are associated with a monitored location, system, or group;

receive, via the mobile access network, a field agent update from a field agent device associated with at least one of the one or more mobile surveillance devices, wherein the field agent device is different from the one or more mobile surveillance devices, wherein the field agent update is received via a field agent interface executing on the field agent device;

receive, from the field agent device, a user selection of an option to use a camera device of the field agent device to replace a media feed associated with the at least one of the one or more mobile surveillance devices;

receive a media stream from the camera device of the field agent device;

include the media stream from the camera device of the field agent device with the surveillance data from the one or more mobile surveillance devices;

identify an event condition associated with the monitored location, system, or group based on the received surveillance data or the field agent update, wherein the event condition corresponds to at least one of the one or more mobile surveillance devices or the field agent device;

generate an alert notification based on the identified event condition;

transmit the alert notification to one or more user devices based on the event identified condition;

receive a request to view at least a portion of the surveillance data from a user device in response to the alert notification; and transmit at least the portion of the surveillance data to the user device in response to the request.

20. The non-transitory computer-readable memory device of claim 19, wherein the surveillance data includes at least location information for the one or more mobile surveillance devices, and wherein the event condition comprises a location-based event condition or a time and location-based event condition.

* * * * *